(12) United States Patent
Kang

(10) Patent No.: US 12,013,019 B2
(45) Date of Patent: Jun. 18, 2024

(54) TORQUE CONVERTER

(71) Applicant: VALEO KAPEC CO., LTD., Daegu (KR)

(72) Inventor: Ju Seok Kang, Daegu (KR)

(73) Assignee: VALEO KAPEC CO., LTD., Daegu (KR)

(*) Notice: Subject to any disclaimer, the term of this patent is extended or adjusted under 35 U.S.C. 154(b) by 0 days.

(21) Appl. No.: 17/641,362

(22) PCT Filed: Jul. 17, 2020

(86) PCT No.: PCT/KR2020/009420
§ 371 (c)(1),
(2) Date: Mar. 8, 2022

(87) PCT Pub. No.: WO2021/049747
PCT Pub. Date: Mar. 18, 2021

(65) Prior Publication Data
US 2023/0258252 A1    Aug. 17, 2023

(30) Foreign Application Priority Data

Sep. 9, 2019  (KR) .................. 10-2019-0111589

(51) Int. Cl.
*F16H 45/02*    (2006.01)
(52) U.S. Cl.
CPC ..... *F16H 45/02* (2013.01); *F16H 2045/0226* (2013.01); *F16H 2045/0252* (2013.01); *F16H 2045/0263* (2013.01)

(58) Field of Classification Search
CPC ............ F16H 45/02; F16H 2045/0226; F16H 2045/0263
See application file for complete search history.

(56) References Cited

U.S. PATENT DOCUMENTS

| 9,599,205 | B2 | 3/2017 | Zaugg |
| 10,451,157 | B2 | 10/2019 | Kawahara |
| 2011/0287844 | A1 | 11/2011 | Steinberger |
| 2015/0114781 | A1 | 4/2015 | Zaugg |
| 2015/0362041 | A1* | 12/2015 | Lee .................. F16F 15/13492 464/68.92 |

(Continued)

FOREIGN PATENT DOCUMENTS

| JP | 2007-192360 A | 8/2007 |
| JP | 2010-216499 A | 9/2010 |

(Continued)

OTHER PUBLICATIONS

International Search Report dated Nov. 11, 2020 in PCT/KR2020/009420 filed Jul. 17, 2020, 3 pages.

(Continued)

*Primary Examiner* — Stacey A Fluhart
*Assistant Examiner* — Aimee Tran Nguyen
(74) *Attorney, Agent, or Firm* — Oblon, McClelland, Maier & Neustadt, L.L.P.

(57) ABSTRACT

The present invention relates to a torque converter that may reduce production cost by a simple structure compared to the conventional art, reduce the overall size of the torque converter by minimizing an installation space of an anti-resonance damper, and improve damping performance.

15 Claims, 13 Drawing Sheets

(56) References Cited

U.S. PATENT DOCUMENTS

| | | | |
|---|---|---|---|
| 2016/0116020 A1* | 4/2016 | Tomiyama | F16F 15/134 |
| | | | 192/3.28 |
| 2016/0116043 A1* | 4/2016 | Tomiyama | F16F 15/1421 |
| | | | 192/3.28 |
| 2016/0327142 A1* | 11/2016 | Takikawa | F16H 45/02 |
| 2017/0108051 A1* | 4/2017 | Lee | F16F 15/145 |
| 2017/0211656 A1 | 7/2017 | Kawahara et al. | |
| 2017/0254398 A1 | 9/2017 | Watanabe | |
| 2017/0276223 A1* | 9/2017 | Kawahara | F16F 15/129 |
| 2019/0264773 A1 | 8/2019 | Yoshikawa et al. | |

FOREIGN PATENT DOCUMENTS

| | | | |
|---|---|---|---|
| JP | 2015-14357 A | | 1/2015 |
| JP | 2015-98929 A | | 5/2015 |
| JP | 2015098929 A | * | 5/2015 |
| JP | 2015-190522 A | | 11/2015 |
| JP | 2018-71624 A | | 5/2018 |
| KR | 10-0284230 B1 | | 4/2001 |
| KR | 10-2012-0039309 A | | 4/2012 |
| KR | 10-2017-0078607 A | | 7/2017 |
| KR | 10-2019-0012454 A | | 2/2019 |
| KR | 10-2019-0061435 A | | 6/2019 |

OTHER PUBLICATIONS

Extended European Search Report dated Oct. 20, 2023, issued in European application No. 20863306.5.

* cited by examiner

TORQUE CONVERTER

CROSS-REFERENCE TO RELATED APPLICATION

This application claims priority to and the benefit of Korean Patent Application No. 10-2019-0111589 filed in the Korean Intellectual Property Office on Sep. 9, 2019, the entire contents of which are incorporated herein by reference.

BACKGROUND OF THE INVENTION

(a) Field of the Invention

The present invention relates to a torque converter which is a fluidly operated power delivery device. More particularly, the present invention relates to a torque converter that may reduce production cost by a simple structure compared to the conventional art, reduce the overall size of the torque converter by minimizing an installation space of an anti-resonance damper, and improve damping performance.

(b) Description of the Related Art

As a fluidly operated power delivery device that transmits power generated from an engine of a vehicle to a transmission, a torque converter provided with a lock-up device is widely applied.

The lock-up device is a device to transmit torque by mechanically connecting a front cover and a turbine, and is disposed in a space between the turbine and the front cover. The torque is directly transmitted to the turbine from the front cover without going through an impeller by the lock-up device.

Generally, the lock-up device includes a piston and a damper mechanism.

The piston is movably disposed along a direction of a central axis, and is engaged with the front cover when the piston is pressed against the front cover, thus the piston rotates by receiving torque from the front cover through a friction force.

The damper mechanism absorbs and attenuates a torsional vibration transmitted from the front cover and transmits it to an output member, and includes an elastic member, preferably a coil spring, elastically connecting an input member integrally rotating with the piston and an output member.

Meanwhile, in addition to the damper mechanism for absorbing and attenuating the torsional vibration, as a technology to improve a vibration damping performance by lowering a resonance frequency to below the practical rotation speed, an anti-resonance damper in which an inertial mass is installed on a torque transmission path has been developed and applied.

In this regard, Korean Patent Publication No. 10-2017-0078607 discloses an anti-resonance damper including a configuration in which an inertial mass body is connected to an outer end of an output member by a coil spring.

However, the anti-resonance damper disclosed in the prior document has a problem that a radial direction size of a torque converter is increased because the anti-resonance damper is disposed in the radial direction outside with respect to an outer coil spring corresponding to a first damper mechanism as a torsion damper.

In addition, for the anti-resonance damper disclosed in the prior document, it is difficult to secure a sufficient size for the inertial mass body due to the limitation of the occupied space of the dynamic damper, and thus the inertial force of the inertial mass body is insufficient, such that the damping performance of the anti-resonance damper is insufficient.

In addition, the anti-resonance damper disclosed in the prior document is configured to radially extend from the outer end of the output member to form a connection portion for the anti-resonance damper, so that the shape of the output member is complicated and the manufacturing cost for the output member is increased.

PRIOR DOCUMENT

Patent Document (Patent Document 0001) Korean Registered Patent Publication No. 10-2017-0078607

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made to solve the problems described above, and is to provide a torque converter provided with an anti-resonance damper that may simplify the structure by eliminating a connecting member by directly installing an inertial mass to an intermediate member and reduce production cost.

Furthermore, the present invention is to provide a torque converter provided with an anti-resonance damper which can reduce a space for installing an inertial mass and the entire size by installing an inertial mass radially outside a damper spring of a torsional damper, and significantly improve damping performance by using a turbine shell as an inertial mass.

A torque converter according to the present invention may include: an impeller connected to the front cover and integrally rotated with the front cover; a turbine provided with a turbine blade receiving torque from the impeller through a fluid and a turbine shell supporting the turbine blade; a lock-up device disposed between the front cover and the turbine; a damper assembly connected to the lock-up device; and an output hub connected to the damper assembly and transmitting the torque to the outside, wherein the damper assembly may include: an input member to which the torque is input from the lock-up device; an output member that is relatively rotatably while connected to the input member and is non-rotatably connected to the output hub; a first damper spring and a second damper spring elastically connecting the input member and the output member with respect to a rotating direction; an intermediate member relatively that is rotatably connected to the input member through the first damper spring and that is relatively rotatably connected the output member through the second damper spring; and an anti-resonance damper installed directly on the intermediate member, and wherein the anti-resonance damper is disposed outside a radial direction with respect to the first damper spring and the second damper spring.

The anti-resonance damper may include a first mass plate disposed close to a front surface of the intermediate member and formed with a ring shape, a second mass plate non-rotatably connected to the first mass plate, disposed close to a rear surface of the damper plate, and formed with a ring shape, and a third damper spring accommodated in the intermediate member and elastically connecting the first mass plate and the second mass plate to the intermediate member with respect to the rotating direction, wherein the first mass plate and the second mass plate may be disposed radially outside with respect to the input member.

A length from a central axis of the torque converter to an outermost end of the anti-resonance damper in a radial direction may be 100% to 105% of a length from the central axis to an outermost end of the lock-up device in the radial direction.

A length from the central axis of the torque converter to an outermost end of the anti-resonance damper in a radial direction may be 110% to 120% of a length from the central axis to an outermost end of the turbine shell in the radial direction.

An occupying area from a front end surface of the first mass plate to a rear end surface of the second mass plate in the central direction may at least partially overlap with an axial occupying area of the first damper spring and the second damper spring.

An occupying area from a front-end surface of the first mass plate to a rear-end surface of the second mass plate in the central direction may entirely overlap with an axial occupying area of the first damper spring and the second damper spring.

The anti-resonance damper may further include an additional mass disposed between the first mass plate and the second mass plate, and connected to the first mass plate and the second mass plate such that it integrally rotates with the first mass plate and the second mass plate.

The anti-resonance damper may further include a connecting bracket non-rotatably connecting at least either one of the first mass plate and the second mass plate to the turbine shell.

The input member may include: a first plate disposed close to a front surface of the intermediate member, relatively non-rotatably connected to the lock-up device, and formed with a ring shape; and a second plate disposed close to a rear surface of the intermediate member, and connected to integrally rotate with the first plate, wherein the first plate and the second plate may be disposed inside the radial direction with respect to the anti-resonance damper.

The first plate and the second plate may include a first spring hole of an arc shape for accommodating the first damper spring and the second damper spring, respectively, and wherein the first damper spring and the second damper spring may be simultaneously accommodated in the first spring hole.

The first damper spring and the second damper spring may be disposed in an arc shape along the same radius inside the first spring hole.

The first damper spring may include a first coil spring having an exterior diameter corresponding to a redial width of the first spring hole and a second coil spring disposed in the first coil spring, and the second damper spring may include a third coil spring having an exterior diameter that is the same as an exterior diameter of the first coil spring, and a fourth coil spring disposed in the third coil spring.

The intermediate member may include: a main plate of a ring shape; a second spring hole formed radially inside the main plate, having a circumferential length corresponding to that of the first spring hole, and accommodating the first damper spring and the second damper spring; and a third spring formed radially outside the second spring hole and accommodating the third damper spring.

The output member may include: a body portion of a disk shape fixed to the output hub; and a spring connecting portion formed by extending in a radial direction from the body portion, wherein the spring connecting portion extends between a first end portion of the first damper spring and a first end portion of the second damper spring, and wherein the first end portion of the first damper spring and the first end portion of the second damper spring are simultaneously supported by the spring connecting portion.

A second end portion of the first damper spring may be simultaneously radially supported by one end of the first spring hole and the second spring hole, and a second end portion of the second damper spring may be simultaneously radially supported by the other end of the first spring hole and the second spring hole.

According to a torque converter according to an embodiment of the present invention, it is possible to simplify the structure by eliminating a connecting member by directly installing an inertial mass to an intermediate member and reduce production cost.

Furthermore, according to the torque converter according to an embodiment of the present invention, since the inertial mass is installed radially outside the damper spring of a damper mechanism, it is possible to reduce a space for installing an inertial mass and the entire size, and damping performance is significantly improved by using the turbine shell as the inertial mass.

DETAILED DESCRIPTION OF THE EMBODIMENTS

Figure 1:
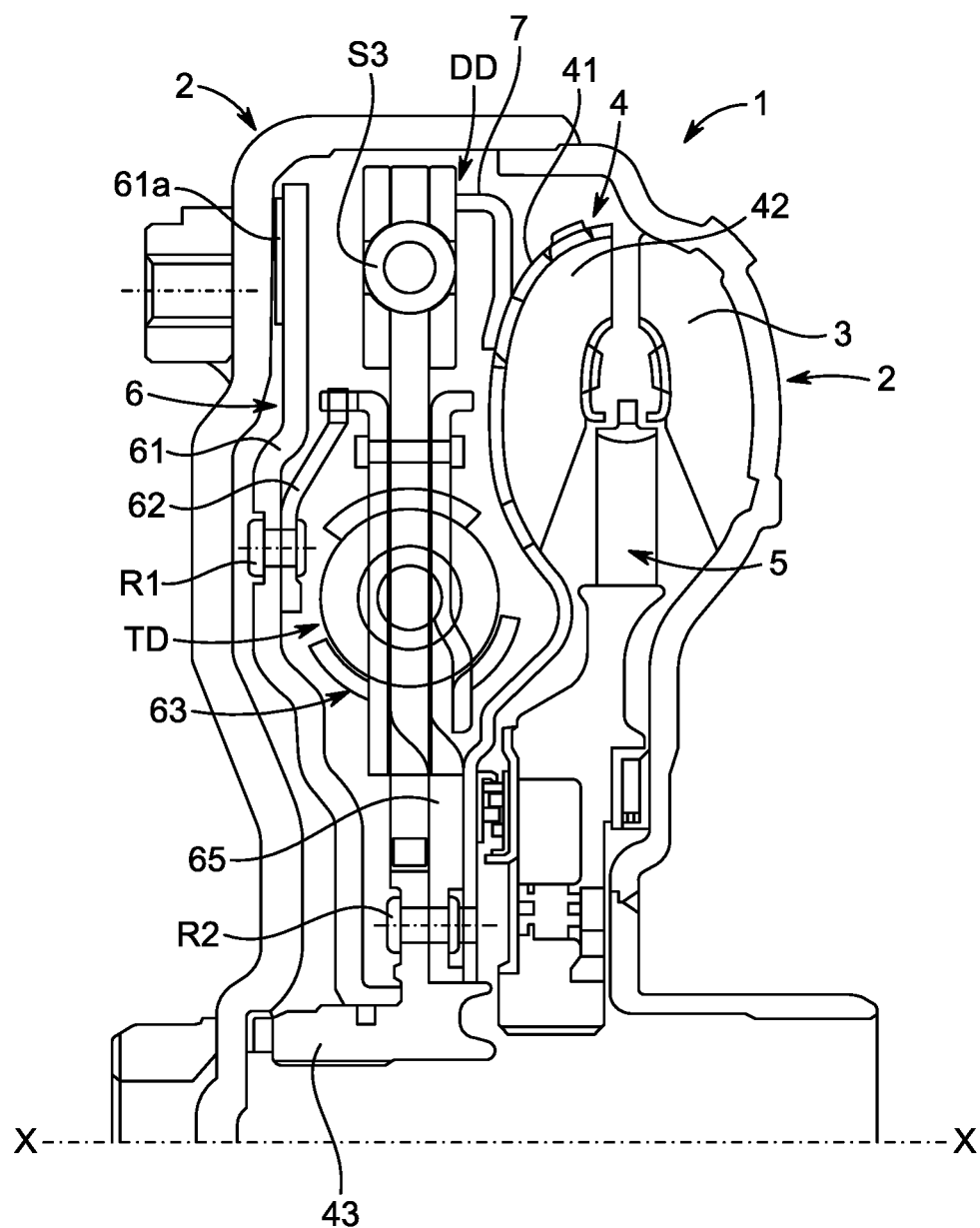
FIG. 1 is a cross-sectional view of a central axis direction of a torque converter provided with an anti-resonance damper according to an embodiment of the present invention.

Hereinafter, a lock-up device for a torque converter according to the present invention is described with reference to accompanying drawings.

The present invention is not limited to embodiments that are described herein. The present invention may be embodied in various embodiments. The embodiments are provided to clearly show the present invention to those skilled in the art, and the present invention is intended to cover various modifications and equivalent arrangements included within the spirit and scope of the appended claims. Accordingly, the present invention is intended to cover not only the embodiments of the present invention, but also various alternatives, modifications, equivalents, and other embodiments, which may be included within the spirit and scope of the present invention as defined by the appended claims.

The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention. In the drawings, the components may be expressed with an exaggerated size or thickness in consideration of convenience of understanding, etc., but this should not be construed as limiting the scope of the present invention.

Terms used in the present specification are used only in order to describe specific embodiments rather than limiting the present invention. Singular forms are to include plural forms unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Terms including ordinal numbers such as first, second, and the like will be used only to describe various components, and are not to be interpreted as limiting these components. The terms are only used to differentiate one component from other components.

Also, in this specification, it is to be understood that when one component is referred to as being "connected" or "coupled" to another component, it may be connected or coupled directly to the other component or may be connected or coupled to another component with the other component intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only for the purpose of describing particular embodiments, and is not intended to be limiting of the invention. Singular forms are to include plural forms unless the context clearly indicates otherwise.

When a component is referred to as being "on" or "below" another component, it should be understood that one component may be disposed directly thereon, but intervening components may also be present.

It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof.

Unless indicated otherwise, all the terms used herein, including technical or scientific terms, have the same meanings as those generally understood by those with ordinary knowledge in the field of art to which the present invention belongs. It must be understood that the terms defined by the dictionary are consistent with the meanings within the context of the related art, and they should not be ideally or excessively formally defined unless the context clearly dictates otherwise.

For convenience, in this specification, directions may be defined as follows.

A front-and-rear direction or an axial direction is a direction parallel to a rotation axis, a front direction means any direction of a power source, such as the direction toward an engine, and a rear direction means another direction, such as the direction toward a transmission. Accordingly, a front surface means the surface faces the front direction, and a rear surface means the surface faces the rear direction.

A radial direction means a direction closer to the center or a direction away from the center along a straight line passing through the center of the rotation axis on a plane perpendicular to the rotation axis. The direction away from the center in the radial direction is referred to as a centrifugal direction, and the direction closer to the center is referred to as a centripetal direction.

A circumferential direction means a direction surrounding the circumference of the rotation axis. An exterior circumference means an outer circumference, and an interior circumference means an inner circumference. Accordingly, the exterior circumference is the opposite surface to that facing the rotation axis, and the interior circumference faces the rotation axis.

A side surface (or lateral surface) in the circumferential direction means a surface whose normal line is approximately toward the circumferential direction.

<Overall Configuration of a Torque Converter>

Figure 2:
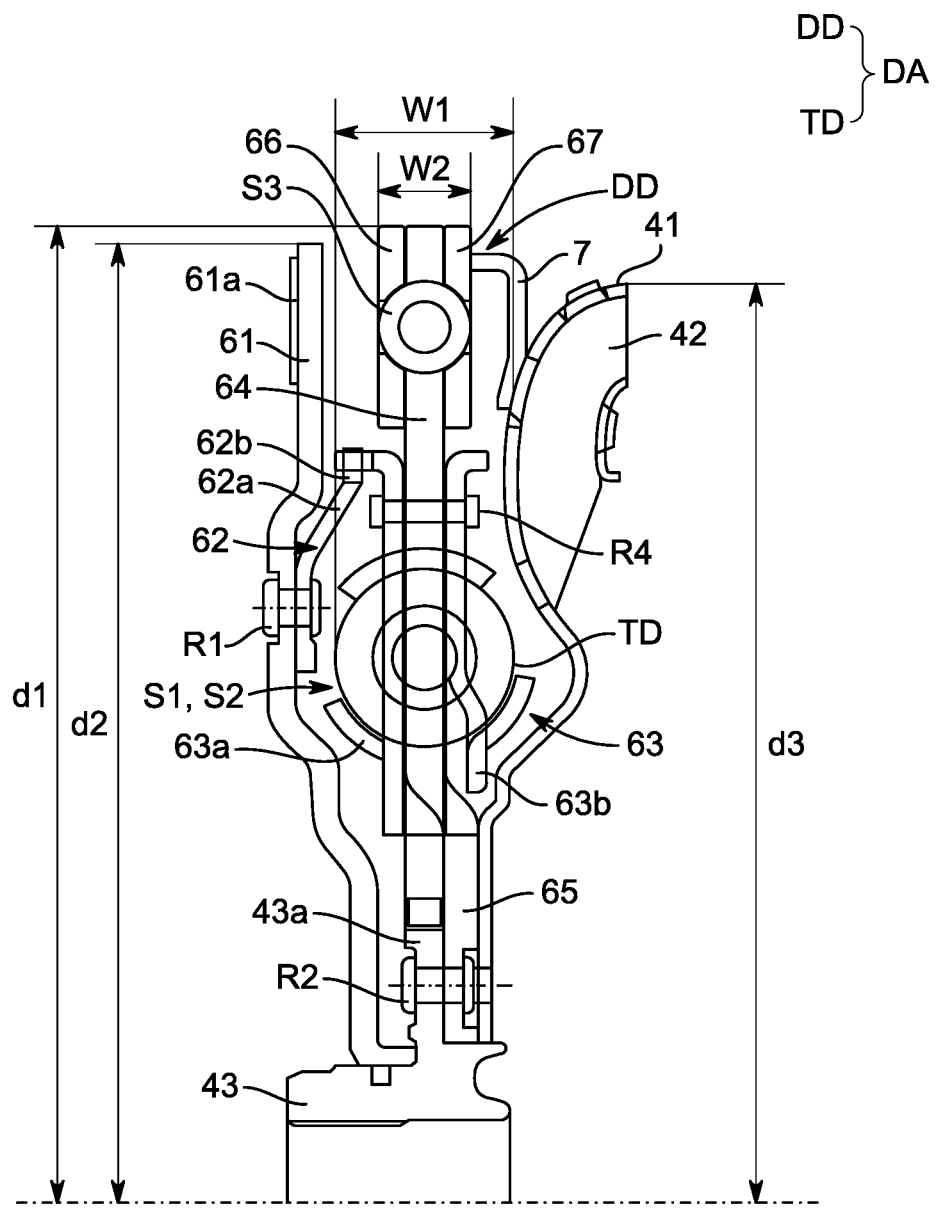
FIG. 2 is a partial enlarged view of FIG. 1.
Figure 3:
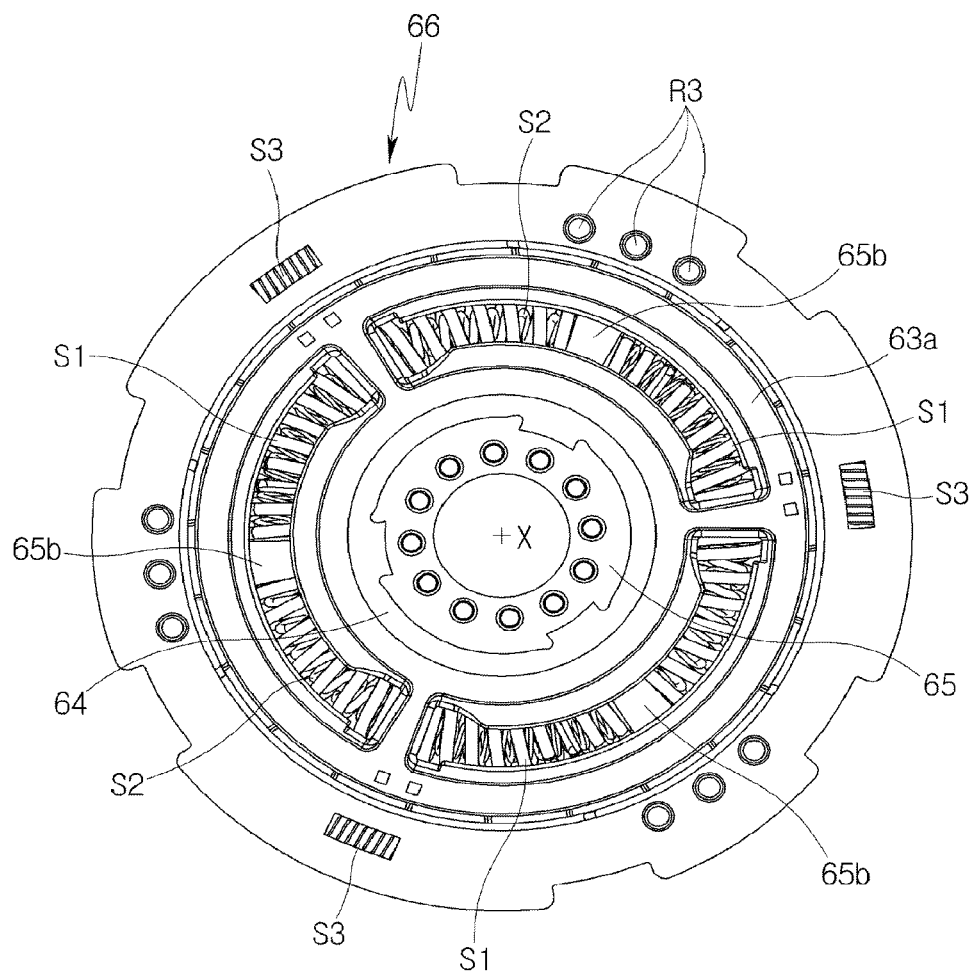
FIG. 3 is a front view of a damper assembly according to an embodiment of the present invention.
Figure 4:
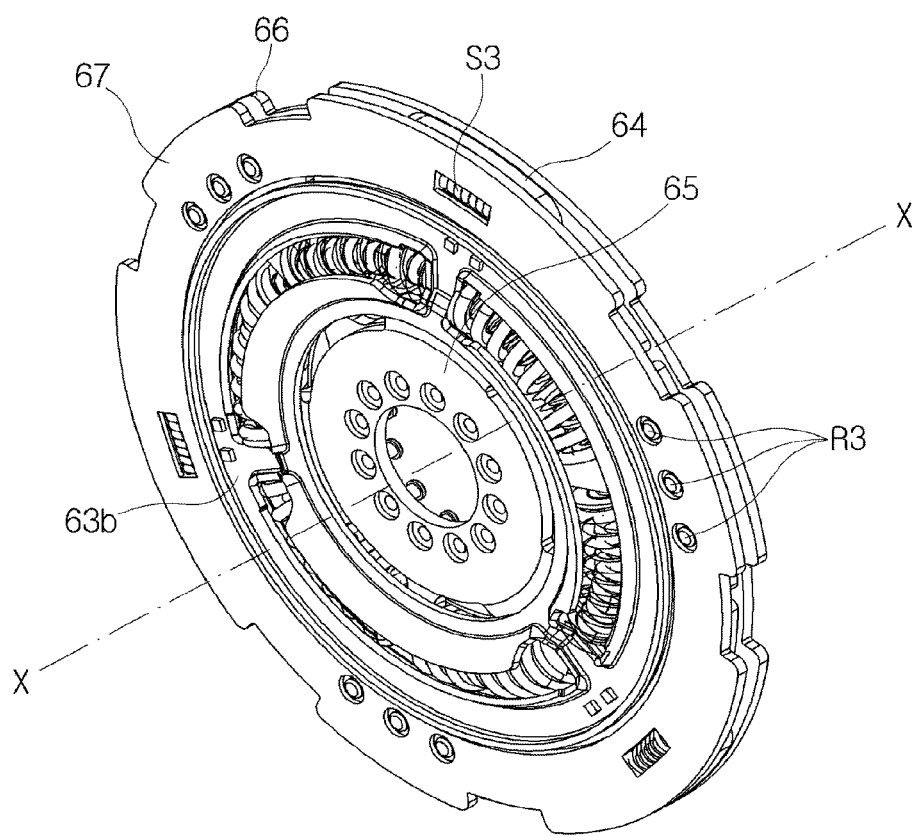
FIG. 4 is a perspective view of FIG. 3.

FIG. 1 is a cross-sectional view of a central axis (X-X) direction of a torque converter 1, and FIG. 2 is a partial enlarged view of FIG. 1. An overall configuration of a torque converter 1 having a damper assembly (DA) according to the embodiment of the present invention is described with reference to FIG. 1 and FIG. 2.

The torque converter 1 is a device for transmitting power from a crankshaft of an engine (not shown) to an input shaft of a transmission (not shown), and is configured to include a front cover 2 to which a torque of a crankshaft is input, an impeller 3 connected to the front cover 2, a turbine 4 connected to an output hub 43, a stator 5 disposed between the impeller 3 and the turbine 4, a lock-up device 6 disposed between the front cover 2 and the turbine 4, and a damper assembly (DA) connected to the lock-up device 6, and the output hub 43 is connected to the damper assembly (DA) and transmits the torque to the outside.

The impeller 3 is fixed to the front cover 2, and a fluid chamber is formed therein by the front cover 2 and the impeller 3.

The turbine 4 is disposed to face the impeller 3 inside the fluid chamber. The turbine 4 includes a turbine shell 41 and a plurality of turbine blades 42 fixed to the turbine shell 41.

The output hub 43 is connected to an input shaft of a transmission (not shown) so that the torque is transmitted outside the torque converter 1. An output plate 65 (which will be described in later) is engaged in a flange 43a of the output hub 43 through a rivet R2.

The stator 5 is a mechanism for adjusting a flow of hydraulic oil from the turbine 4 to the impeller 3, and is disposed between the impeller 3 and the turbine 4.

<Configuration of the Lock-Up Device>

The lock-up device 6 serves to mechanically connect the front cover 2 and the turbine 4 as necessary, and is disposed in the space between the front cover 2 and the turbine 4 as shown in FIG. 1.

More particularly, as shown in FIG. 2, the lock-up device 6 includes a piston 61 and a drive plate 62, and the drive plate 62 is connected to an input plate 63 of the damper assembly (DA) so that the drive plate 62 integrally rotates with the input plate 63 of the damper assembly (DA).

Piston

The piston 61 functions to switch a torque transmission path between the front cover 2 and the turbine 4, and is installed to directly receive the torque of the front cover 2 through friction force when it is pressed to the front cover 2 side by the action of the hydraulic pressure to be in close contact with the inner surface of the front cover 2.

For this, the inner end of the piston 61 is supported to be movable by the output hub 43 in a central axis (X-X) direction, and is also supported to be relatively rotatable with respect to the output hub 43. Furthermore, a friction member 61a as a means for increasing the friction force and effectively transmitting the torque of the front cover 2 to the piston 61 is installed on one side of the piston 61 facing the inner surface of the front cover 2.

Drive Plate

The drive plate 62 is fixed to the above-described piston 61 to function as a member converting the torque transmission path together with the piston 61.

A radially inner end portion of a main body portion 62a of the drive plate 62 is firmly fixed to the piston 61 in multiple places through rivets R1 so as to act as a member for converting the torque transmission path together with the piston 61.

Meanwhile, in a radially outer end portion of the main body portion 62a, an outer catching portion 62b engaged with a connecting protrusion 63a-6 of an input plate 63 is provided in a form of a tooth.

<Configuration of Damper Assembly>

As shown in FIG. 1, the damper assembly (DA) absorbs and attenuates a vibration included in the torque input through the above-described lock-up device 6 and transmits it to the output hub 43, and includes an input plate 63 as an input member, a first damper spring S1, an intermediate plate 64 as an intermediate member, a torsional damper (TD) provided with a second damper spring S2 and an output plate 65 as an output member, and an anti-resonance damper (DD) directly connected to the intermediate plate 64 of the intermediate member.

Input Member—Input Plate

The input plate 63 functioning as the input member according to an embodiment of the present invention is connected to the drive plate 62 to rotate integrally with the drive plate 62 so that the torque is input from the drive plate 62 of the lock-up device 6.

Figure 5:
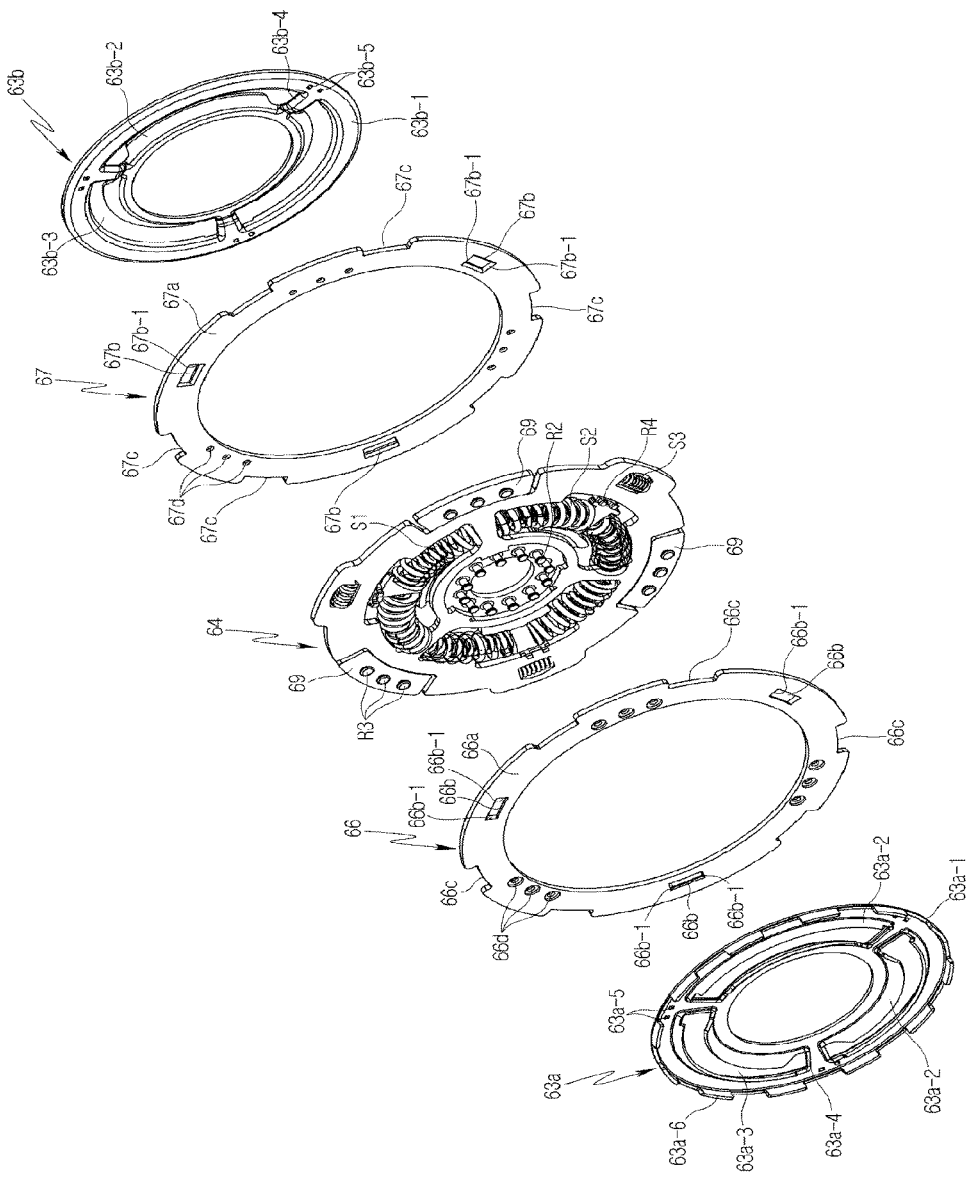
FIG. 5 and FIG. 6 are exploded perspective views of the damper assembly illustrated in FIG. 3.
Figure 6:
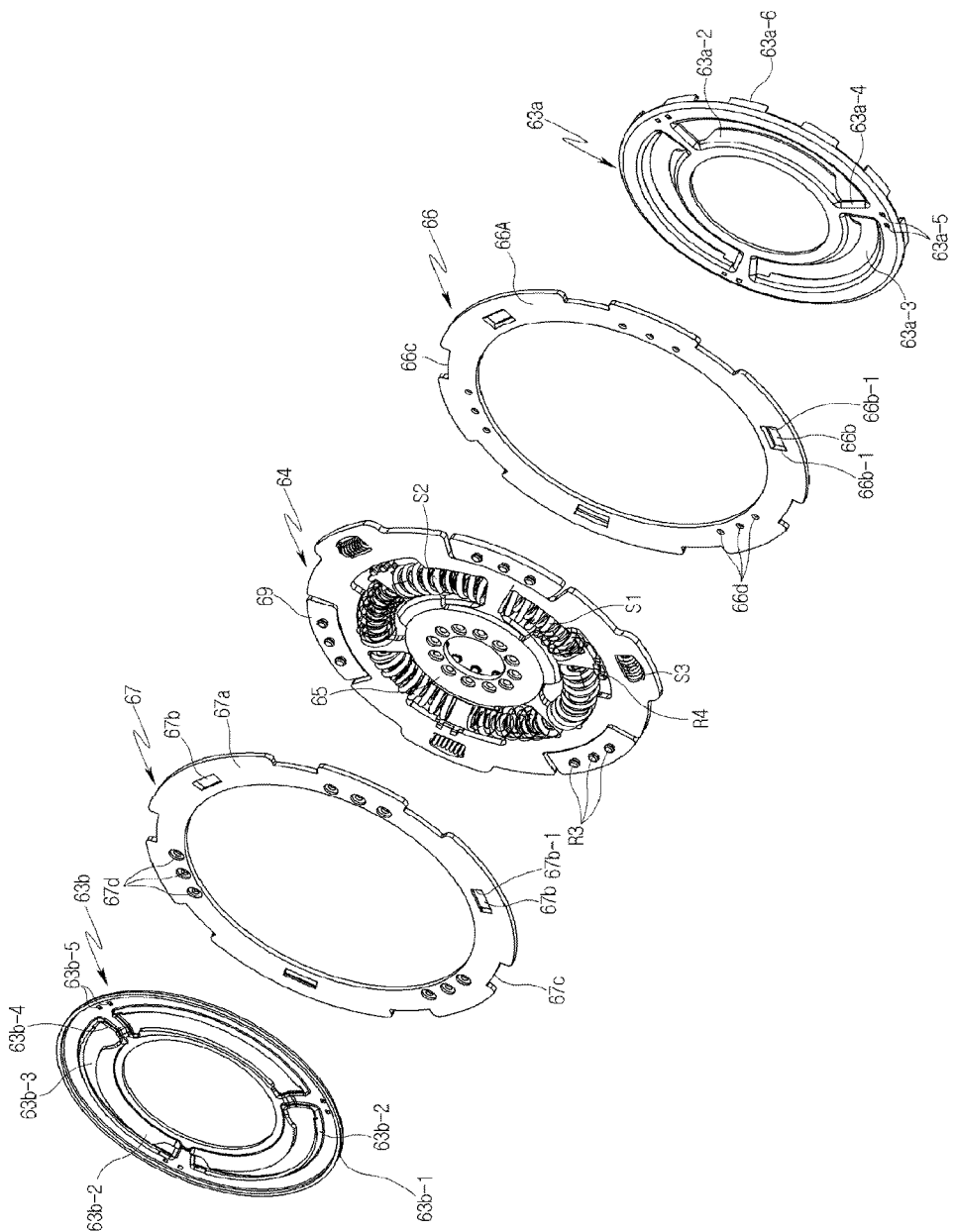
Figure 7:
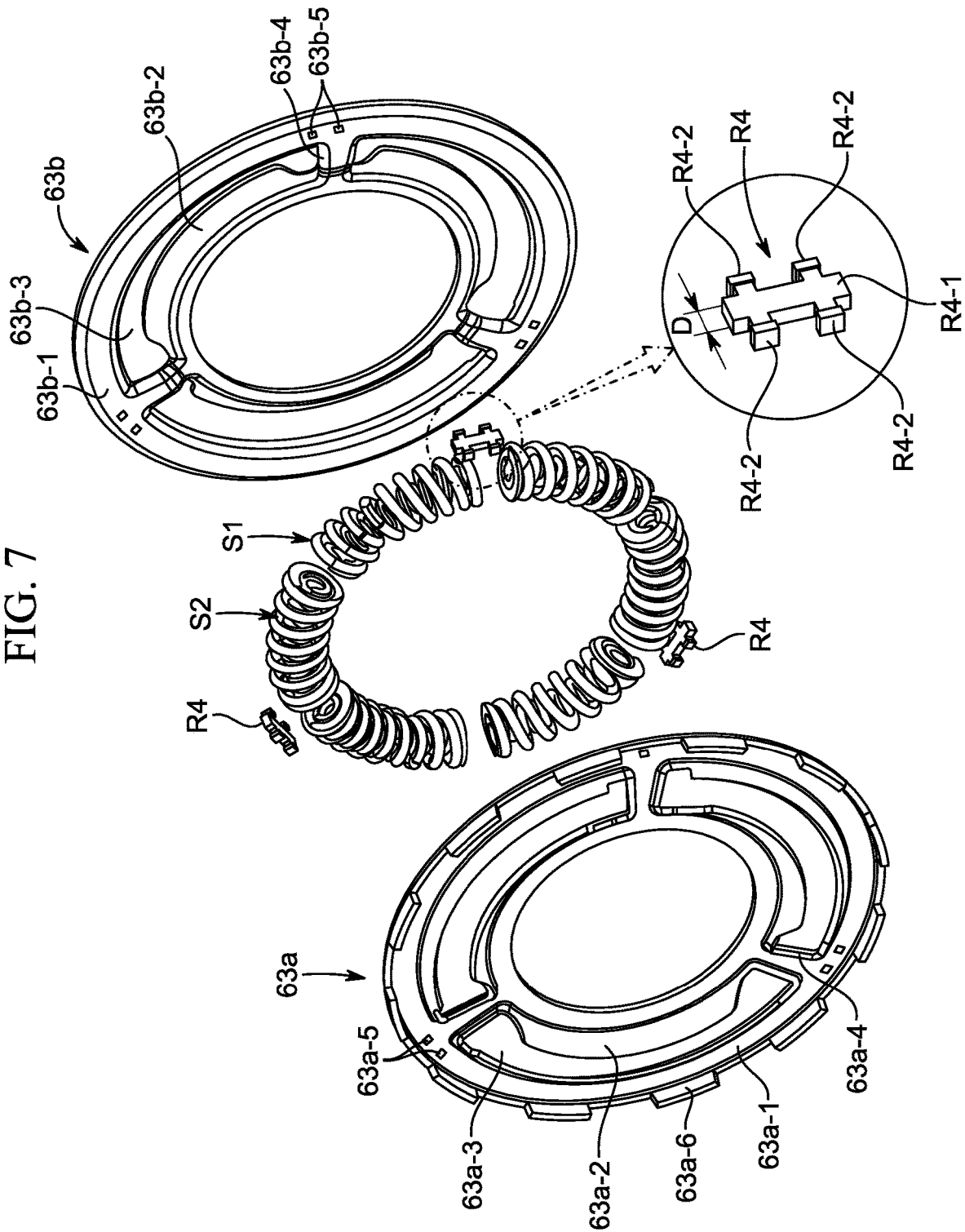
FIG. 7 is an exploded perspective view for explanation of an input member illustrated in FIG. 3.

A detailed configuration of the input plate 63 is shown in FIGS. 5 to FIG. 7. Referring to FIG. 5 to FIG. 7, the input plate 63 according to an embodiment of the present invention includes a first plate 63a of a ring shape disposed adjacent to the above-described drive plate 62, and a second plate 63b of a ring shape disposed adjacent to the turbine shell 41 and connected to the first plate 63a to integrally rotate with the first plate 63a.

The first plate 63a and the second plate 63b may be manufactured into a ring shape by pressing a metal plate. In the following drawing, the only difference is that a connecting protrusion 63a-6 extends in the central axis (X-X) in the first plate 63a. An embodiment is shown in which the first plate 63a and the second plate 63b having approximately the same shape and dimensions are disposed to face each other. However, the scope of the present invention is not limited thereto. The following description is made based on the embodiment in which the first plate 63a and the second plate 63b have approximately the same shape and dimensions.

The input plate 63 transfers the torque input from the drive plate 62 of the lock-up device 6 to the intermediate plate 64 of the intermediate member through a first damper spring S1. To this end, in first spring holes 63a-3 and 63b-3 for accommodating the first damper spring S1 are formed in a body portion 63a-1 of the first plate 63a and a body portion of the second plate 63b, respectively.

The first spring holes 63a-3 and 63b-3 are machined into an arc shape extending along a rotating direction. Although an embodiment in which three first spring holes 63a-3 and 63b-3 are provided is shown in the accompanying drawings, the scope of the present invention is not limited thereto, and the number of the first spring holes may be variously modified and applied as necessary.

Furthermore, a second damper spring S2 connecting an intermediate plate 64 and an output plate 65 is simultaneously accommodated in the first spring holes 63a-3 and 63b-3.

That is, the first spring holes 63a-3 and 63b-3 may be divided into a first area in which the first damper spring S1 is accommodated and a second area in which the second damper spring S2 is accommodated, and a spring connecting portion 65b is inserted between the first damper spring S1 and the second damper spring S2. More particularly, the first end portion S1-1 of the first damper spring S1 and the first end portion S2-1 of the second damper spring S2 are simultaneously supported on the spring connecting portion 65b of the output plate 65 in a state where the spring connecting portion 65b of the output plate 65 is interposed between the first end portion S1-1 of the first damper spring S1 and the first end portion S2-1 of the second damper spring S2.

As described above, since the first damper spring S1 and the second damper spring S2 are simultaneously accommodated in the first spring holes 63a-3 and 63b-3, it is possible to significantly reduce a radial size compared to a configuration in which the first damper spring S1 and the second damper spring S2 are accommodated in separated spring holes formed at different positions.

The detailed disposal relationship of the first damper spring S1 and the second damper spring S2 will be described later referring to FIG. 8.

Meanwhile, for effective accommodation and prevention of disengagement of the first damper spring S1 and the second damper spring S2, spring holders 63a-2 and 63b-2 are formed in the first spring hole 63a-3 of the first plate 63a and the second spring hole 64d of the second plate 63b, respectively. These spring holders 63a-2 and 63b-2 are formed by bending a cut portion from the body portions 63a-1 and 63b-1. Accordingly, it is possible to effectively prevent the first damper spring S1 and the second damper spring S2 from being separated in the central axis (X-X) direction without an additional member. The second end portion S1-2 of the first damper spring S1 and the second end portion of the second damper spring S2 are supported by first spring catching portions 63a-4 and 63b-4 formed at both ends of the first spring holes 63a-3 and 63b-3, thereby preventing separation of the first damper spring S1 and the second damper spring S2 in the rotating direction.

The first plate 63a and the second plate 63b are connected to each other through rivet R4 to integrally rotate with each other. A rivet hole 63b-5 through which a head portion R4-2 of the rivet R4 passes is formed in body portions 63a-1 and 63b-1 of the first plate 63a and the second plate 63b. However, in the damper assembly DA according to an embodiment of the present invention, since the intermediate plate 64 of the intermediate member is inserted between the first plate 63a and the second plate 63b, a gap maintaining portion R4-1 is formed in the rivet R4 so that a predetermined gap is formed between the first plate 63a and the second plate 63b.

Although the embodiment in which the gap maintaining portion R4-1 is formed as a cuboid shape having a predetermined width D in an axial direction is shown in FIG. 7, this is only an example. A means in which the first plate 63a and the second plate 63b are engaged in a state where a predetermined gap is maintained with each other may be applied without limitation.

Intermediate Member—Intermediate Plate

According to an embodiment of the present invention, the intermediate plate 64 functioning as the intermediate member is relatively rotatably connected to the input plate 63 through the first damper spring S1, and relatively rotatably connected to an output plate 65 through the second damper spring S2.

Figure 9:
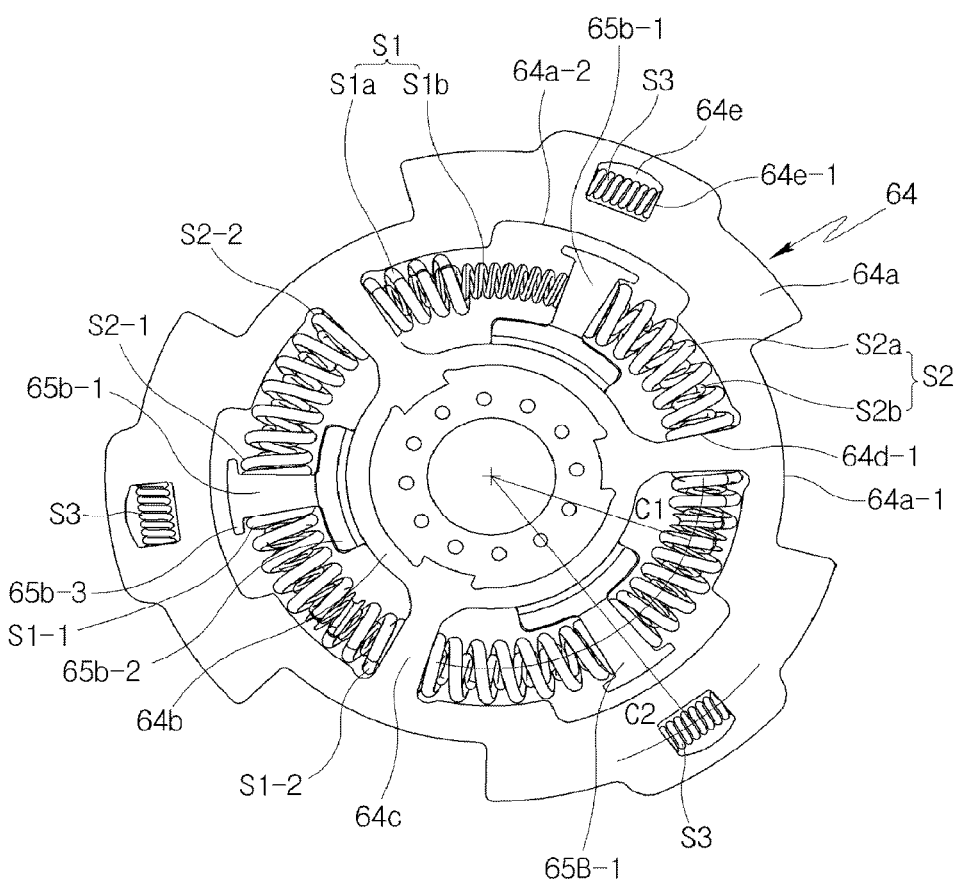
FIG. 9 is a front view for explaining an intermediate member and an output member of the damper assembly according to an embodiment of the present invention.
Figure 10:
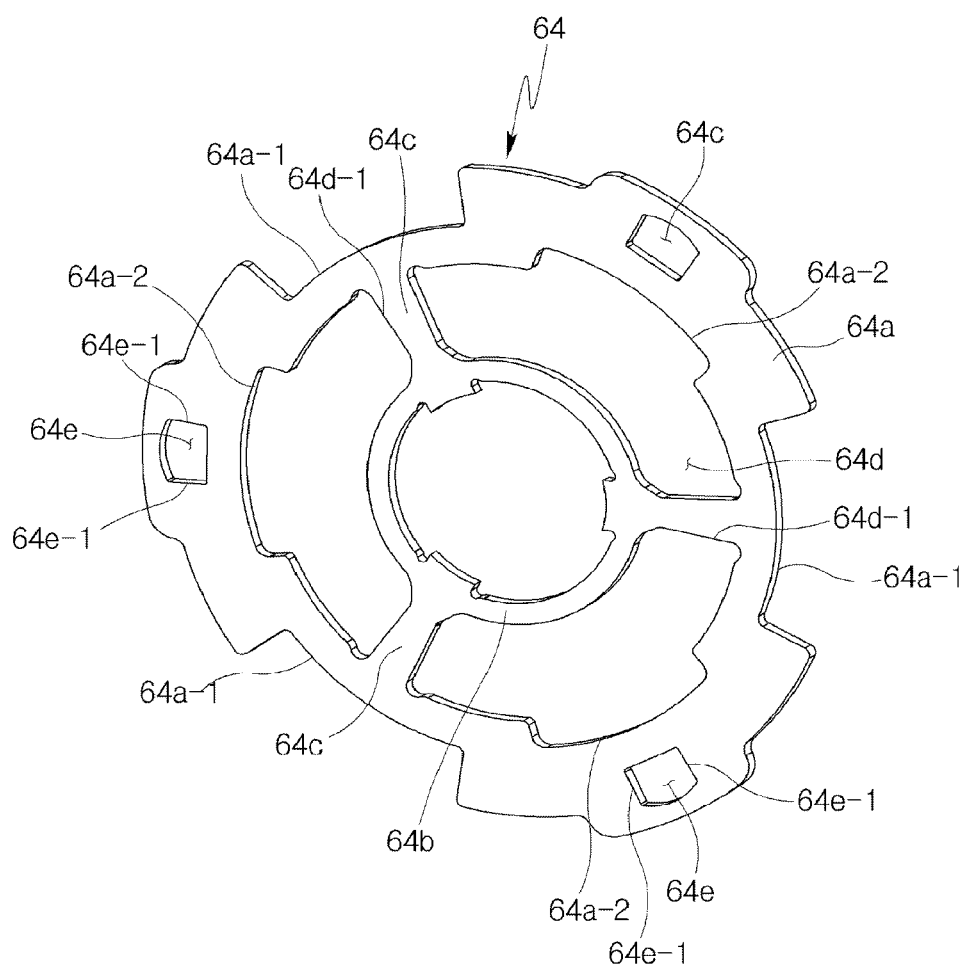
FIG. 10 is a perspective view of the intermediate member illustrated in FIG. 9.

As shown in FIG. 9 and FIG. 10, the intermediate plate 64 may be manufactured by pressing a disk-shaped metal plate, and include a main plate 64a formed as a ring shape, a subplate 64b formed at a radially interior side of the main plate 64a and having a ring shape, and a connecting bridge 64c connecting the main plate 64a and the sub plate 64b.

Second spring holes 64d in which the first damper spring S1 and the second damper spring S2 are accommodated are formed as an arc shape between the main plate 64a and the subplate 64b along the rotating direction. Although the embodiment in which three second spring holes 64d corresponding to the first spring holes 63a-3 and 63b-3 are formed is shown in the accompanying drawing, the scope of the present invention is not limited thereto, and the number and the shape of the second spring hole 64d may be variously modified and applied as necessary.

The second spring holes 64d are formed to pass though the intermediate plate 64 and have same circumferential length as the first spring holes 63a-3 and 63b-3. And both ends of the second spring holes 64d serve to support the first damper spring S1 and the second damper spring S2 like the first spring holes 63a-3 and 63b-3. Accordingly, in a state where the torque is not input to the damper assembly DA, the second end portion S1-2 of the first damper spring S1 is simultaneously contacted to and supported by first spring catching portions 63a-4 and 63b-4 and second spring catching portion 64d-1, wherein the first spring catching portions 63a-4 and 63b-4 are formed in one end of the first spring holes 63a-3 and 63b-3 of the input plate 63, and the second spring catching portion 64d-1 is formed in one end of the second spring hole 64d of the intermediate plate 64. At the same time, the second end portion of the second damper spring S2 is simultaneously contacted to and supported by first spring caching portions 63a-4 and 63b-4 and a second spring caching portion 64d-1, wherein the first spring caching portions 63a-4 and 63b-4 are formed in the other end of the first spring holes 63a-3 and 63b-3 of the input plate 63, and the second spring caching portion 64d-1 is formed in the other end of the second spring hole 64d of the intermediate plate 64.

Furthermore, a guide groove 64a-2 functioning as a rotation passage of the rivet R4 is integrally formed in the second spring hole 64d, and the gap maintaining portion R4-1 of the rivet R4 of the input plate 63 passes through the guide groove 64a-2.

A plurality of third spring holes 64e accommodating a third damper spring S3 are formed in radially exterior of the second spring hole 64d. That is, the third spring hole 64e is formed so that the third damper spring S3 is disposed along a larger radius C2 than a radius C1 where the first damper spring S1 and the second damper spring S2 are disposed. Both ends of the third spring holes 64e in the rotating direction act as a third spring caching portion 64e-1 supporting and pressing the third damper spring S3. Although an embodiment in which three damper springs and third spring holes 64e are provided at equal intervals is shown in the accompanying drawing, this is only an example and the number and shape of the damper spring and the spring holes may be variously modified and applied as necessary.

Meanwhile, at least one accommodating groove 64a-1 is formed between the third spring holes 64e in the rotating direction, and the accommodating groove 64a-1 is concavely formed inward in the radial direction. The accommodating groove 64a-1 is a space in which an additional mass 69 of the anti-resonance damper DD is accommodated.

The detailed description of the anti-resonance damper DD including the third damper spring S3 and the accommodating groove 64a-1 will be described later referring to FIG. 3 to FIG. 6.

Output Member—Output Plate

The output plate 65 as the output member serves to finally transmit the vibration-damped torque to the output hub 43 through the damper assembly DA, is relatively rotatably provided for each of the input plate 63 and the intermediate plate 64, and is relatively non-rotatably connected to the output hub 43.

Figure 11:
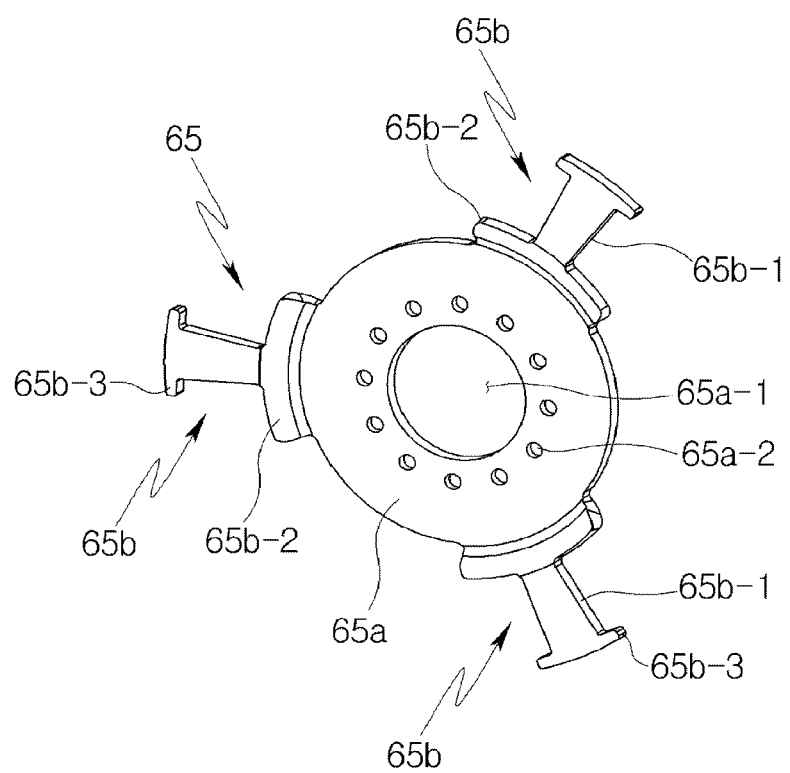
FIG. 11 is a perspective view of the output member illustrated in FIG. 9.

As shown in FIG. 11, the output plate 65 includes a body portion 65a of a disk shape fixed to the output hub 43 through a rivet R2, and a spring connecting portion 65b formed by extending in the radial direction from the body portion 65a.

A central hole 65a-1 and a plurality of rivet holes (65a-2) through which the rivet R2 passes are formed in the body portion 65a of the disk shape.

The spring connecting portion 65b is a portion in which the torque is transmitted through the second damper spring S2 by extending outward in the radial direction from the body portion 65a, and includes a spring connecting protrusion 65b-1 extended between the first end portion S1-1 of the first damper spring S1 and the first end portion S2-1 of the second damper spring S2 and simultaneously supporting the first end portions S1-1 and S2-1.

An inner guide protrusion 65b-2 is formed in a radially inner end of the spring connecting protrusion 65b-1 and an outer guide protrusion 65b-3 is formed in a radially outer end of the spring connecting protrusion 65b-1. And separation of the first end portions S1-1 and S2-1 of the first damper spring S1 and the second damper spring S2 may be prevented in the radial direction by the inner guide protrusion 65b-2 and the outer guide protrusion 65b-3.

First Damper Spring and Second Damper Spring

The first damper spring S1 and the second damper spring S2 of the torsional damper TD are formed as a coil spring, and simultaneously accommodated in the first spring holes 63a-3 and 63b-3 and the second spring hole 64d in a circular arc shape along the same radius.

However, the first damper spring S1 and the second damper spring S2 according to the present invention have a dual spring structure in order to minimize an axial size of the damper assembly DA by minimizing the width of the springs and increase damping performance.

Figure 8:
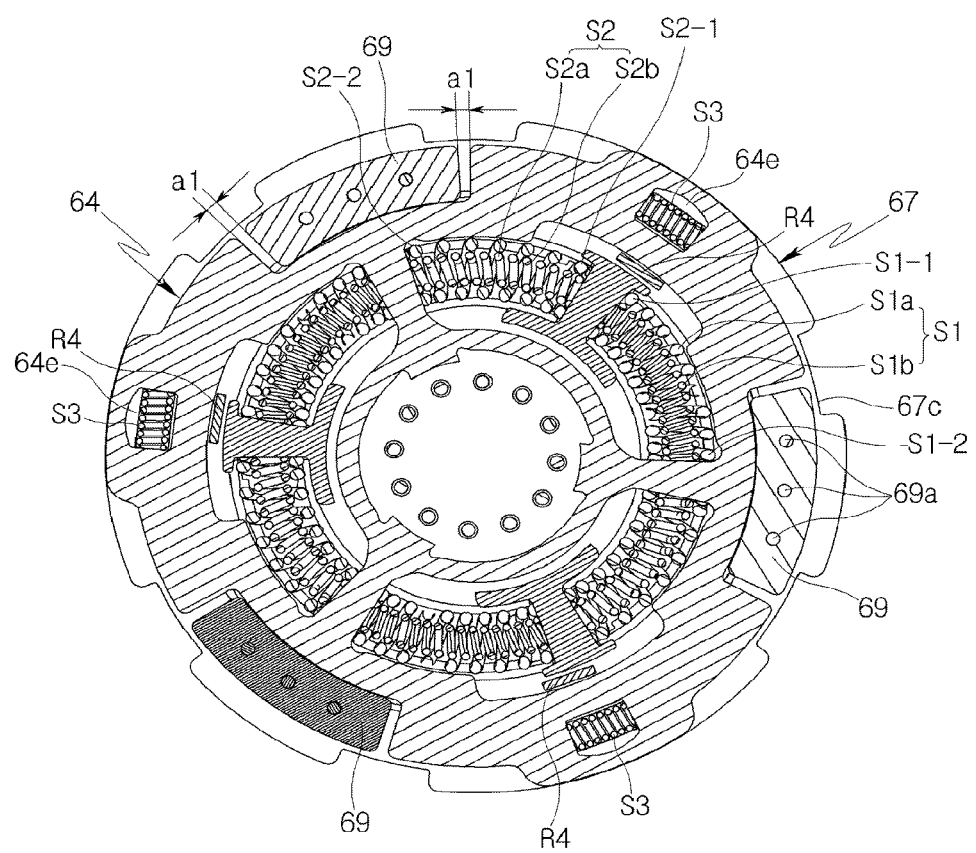
FIG. 8 is a cross-sectional view in a direction perpendicular to a central axis of the damper assembly illustrated in FIG. 3.

More particularly, as shown in FIG. 8 and FIG. 9, first damper spring S1 includes a first coil spring S1a having an exterior diameter corresponding to a radial width of the first spring holes 63a-3 and 63b-3, and a second coil spring S1b disposed in the first coil spring S1a. The second damper spring S2 includes a third coil spring S1a having an exterior diameter corresponding to a radial width of the first spring holes 63a-3 and 63b-3, and a fourth coil spring S1b disposed in the third coil spring S1a.

In this case, in order to reduce manufacturing cost, it is preferable that the first coil spring S1a and the third coil spring S1a have the same shape and length, and the second coil spring S1b and the fourth coil spring S1b have the shape and length. But the present invention is not limited thereto, and the first coil spring S1a may be longer than the third coil spring S1a, and the second coil spring S1b may be longer than the fourth coil spring S1b considering design variables. These variations are included within the spirit and scope of the appended claims.

An embodiment in which the first coil spring S1a is longer than the third coil spring S1a and the second coil spring S1b is longer than the fourth coil spring S1b is shown in FIG. 8 and FIG. 9, and for convenience, it will be described based on the illustrated embodiment.

Inertial Mass

The inertial mass of the anti-resonance damper DD includes a first mass plate 66 of a ring shape disposed close to a front surface of the intermediate plate 64, and a second mass plate 67 of a ring shape relatively non-rotatably coupled to the first mass plate 66 and disposed close to a rear surface of the damper plate.

As shown in FIG. 3 to FIG. 6, the first mass plate 66 and the second mass plate 67 are formed as a plate-shaped ring member similar to the main body portion 64a of the intermediate plate 64, and installed adjacent to the front surface and the rear surface of the main body portion 64a of the intermediate plate 64 in the central axis (X-X) direction.

Furthermore, in the radial direction, the first mass plate 66 and the second mass plate 67 are disposed in a radial exterior of the first damper spring S1 and the second damper spring S2, and further disposed in a radial exterior of the input plate 63. In the central axis (X-X) direction, the first mass plate 66 and the second mass plate 67 are disposed such that an occupying area W2 from a front-end surface of the first mass plate 66 to a rear-end surface of the second mass plate 67 at least partially overlaps with an occupying area W1 of the first damper spring S1 and the second damper spring S2 in the axial direction. Preferably, the occupying area W2 entirely overlaps with the occupying area W1.

According to the present invention as described above, the inertial mass, which was conventionally a single component, is divided into two parts and disposed on the front surface and the rear surface of the intermediate plate 64 in the central axis (X-X) direction, respectively. Accordingly, a space occupied by the inertial mass may be minimized. Furthermore, since the inertial mass is disposed so as not to deviate from the area W1 occupied by the first damper spring S1 and the second damper spring S2 in the central axis (X-X) direction, it is possible to significantly decrease a dimension of the anti-resonance damper DD in the central axis direction.

Furthermore, as shown in FIG. 2, according to an embodiment of the present invention, a length d1 from the central axis (X-X) to an outermost end of the anti-resonance damper DD in the radial direction is 100% to 105% of a length d2 from the central axis (X-X) to an outermost end of the lock-up device 6 in the radial direction. And the length d1 from the central axis (X-X) to the outermost end of the anti-resonance damper DD in the radial direction is 110% to 120% of a length d3 from the central axis (X-X) to an outermost end of the turbine shell 41 in the radial direction. As such, by limiting the radial length occupied by the anti-resonance damper DD relative to a radial length of the piston 61 of the lock-up device 6 and the turbine shell 41, it is possible to significantly reduce a radial size of the damper assembly DA compared to the conventional art.

Meanwhile, the first mass plate 66 and the second mass plate 67 are engaged with each other through a rivet R3 and operated as one unit. Though this configuration, the first mass plate 66 and the second mass plate 67 have the same effect as a single mass body.

To this end, rivet holes 66d and 67d though which the rivet R3 penetrates and extends are formed in the body portion 66a of the first mass plate 66 and the body portion 67a of the second mass plate 67, respectively.

Furthermore, unlike the conventional art, the first mass plate 66 and the second mass plate 67 are directly connected to the third damper spring S3 of a damper spring without an intermediate connecting member.

To this end, fourth spring holes 66b and 67b are formed in the first mass plate 66 and the second mass plate 67, respectively, to at least partially accommodate the third damper spring S3 in cooperation with each other, and both ends of the fourth spring holes 66b and 67b act as fourth spring catching portions 66b-1 and 67b-1 that contact and pressurize both ends of the third damper spring S3 during damping action.

Although an embodiment in which the fourth spring holes 66b and 67b are formed in the first mass plate 66 and the second mass plate 67, respectively, is shown in FIGS. 3 to 6, this is only an example. An embodiment in which a spring hole is formed in only one of the first mass plate 66 and the second mass plate 67 is also included within the spirit and scope of the appended claims. Although not limited thereto, for convenience, the following description will be described based on an embodiment in which the fourth spring holes 66b and 67b are formed in the first mass plate 66 and the second mass plate 67, respectively.

The fourth spring holes 66b and 67b are formed to have same circumferential width as the third spring hole 64e of the intermediate plate 64.

As such, since the first mass plate 66 and the second mass plate 67 are directly connected to the third damper spring S3 without an intermediate connecting member unlike the conventional art, it is possible to simplify the structure of the anti-resonance damper DD and significantly reduce production cost.

Furthermore, as shown in FIG. 2, the fourth spring holes 66b and 67b of the first mass plate 66 and the second mass plate 67 include an inner opening toward the input plate 63 and an outer opening, respectively. And a radial width of the inner opening may be greater than a radial width of the outer opening, while the radial width of the outer opening may be less than an exterior diameter of the third damper spring S3.

Accordingly, a part of the third damper spring S3 is exposed to the outside through the fourth spring hole 66b of the first mass plate 66 in the central axis (X-X) direction of the front surface of the first mass plate 66, and a part of the third damper spring S3 is exposed to the outside through the fourth spring hole 67b of the second mass plate 67 in the central axis (X-X) direction of the rear surface of the first mass plate 66.

As such, since the radial width of the inner opening and the radial width of the outer opening of the fourth spring holes 66b and 67b of the first mass plate 66 and the second mass plate 67 are determined as described above, it is possible to support the third damper spring S3 and prevent the separation of the third damper spring S3 without an addition member or additional machining of the first mass plate 66 and the second mass plate 67.

Furthermore, as described above, the damper assembly DA according to the present invention is configured to have a reduced size in the central axis (X-X) direction and the redial direction compared to the conventional art, so there may be a problem that anti-resonance damping performance is deteriorated. To solve above problem, as a means for increasing inertia of the inertial mass, the anti-resonance damper DD according to the present invention is configured to further include an additional mass 69, and is configured to use the turbine shell 41 as a mass body.

As shown in FIG. 5 and FIG. 6, the additional mass 69 is installed into the accommodating groove 64a-1 of the intermediate plate 64 between the first mass plate 66 and the second mass plate 67.

In order to not interfere with a relative movement of the additional mass 69 and the intermediate plate 64 during damping action, it is preferable that the additional mass 69 and the accommodating groove 64a-1 of the intermediate plate 64 are spaced apart to have a predetermined angle a1. The predetermined angle a1 may be set to be greater than or equal to a relative rotation angle in a state in which the third damper spring S3 is maximally compressed. Here, the state in which the third damper spring S3 is maximally compressed may be a state in which the additional mass 69 maximally moves relative to the intermediate plate 64.

The additional mass 69 is engaged in the first mass plate 66 and the second mass plate 67 through the rivet R3 to integrally rotate with the first mass plate 66 and the second mass plate 67, and a penetration hole 69a through which the rivet R3 extends is formed in the additional mass 69.

Next, as a means for using the turbine shell 41 as a mass body, the anti-resonance damper DD according to the present invention includes a connecting bracket 7 non-rotatably connecting at least one of the first mass plate 66 and the second mass plate 67 to the turbine shell 41.

Figure 12:
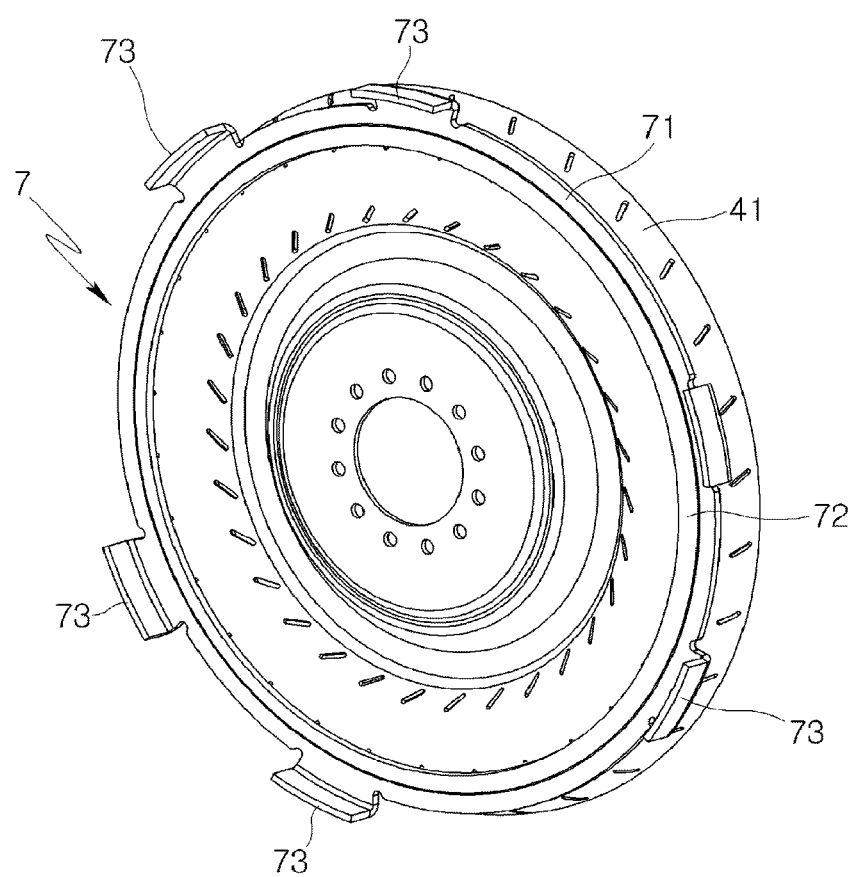
FIG. 12 is a perspective view illustrating a state in which a connecting bracket is attached to a turbine shell.

As shown in FIG. 12, the connecting bracket 7 includes a body portion 71 of a ring shape, a plurality of engaging protrusion 73 protruding and extending from the body portion 71 in the central axis (X-X) direction, and an attaching portion 72 formed by bending from the body portion 71 to correspond to the outer exterior surface of the turbine shell 71 and engaged with the exterior surface of the turbine shell 71 by welding, etc.

The engaging protrusions 73 of the connecting bracket 7 are tooth-engaged in such a way that they are inserted into connecting grooves 66c and 67c formed in the radially outer end of the first mass plate 66 and the second mass plate 67. However, the present invention is not limited thereto, and an embodiment in which the engaging protrusions may be provided in any one of the first mass plate 66 or the second mass plate 67, and the connecting groove may be formed in the connecting bracket 7, is also applicable. These variations are included within the spirit and scope of the appended claims.

Third Damper Spring

The third damper spring S3, which elastically connects the first mass plate 66 and the second mass plate 67 to the intermediate plate 64 in the rotating direction is inserted and accommodated in the third spring hole 64e of the intermediate plate 64. Both ends of the third damper spring S3 are elastically deformably supported by the third spring catching portion 64e-1 of the third spring hole 64e and the fourth spring catching portions 66b-1 and 67b-1 of the first mass plate 66 and the second mass plate 67. And the third damper springs S3 are disposed along the larger diameter C2 than C1.

Accordingly, when the intermediate plate 64 is relatively rotated with respect to the first mass plate 66 and the second mass plate 67, or vice versa, the third damper spring S3 is compressed in the rotating direction, thus the vibration having a phase opposite to the vibration input to the intermediate plate 64 is applied to the intermediate plate 64, and the torque in which the vibration is damped is transmitted to the output plate 65.

<Operation of Torque Converter>

Figure 13:
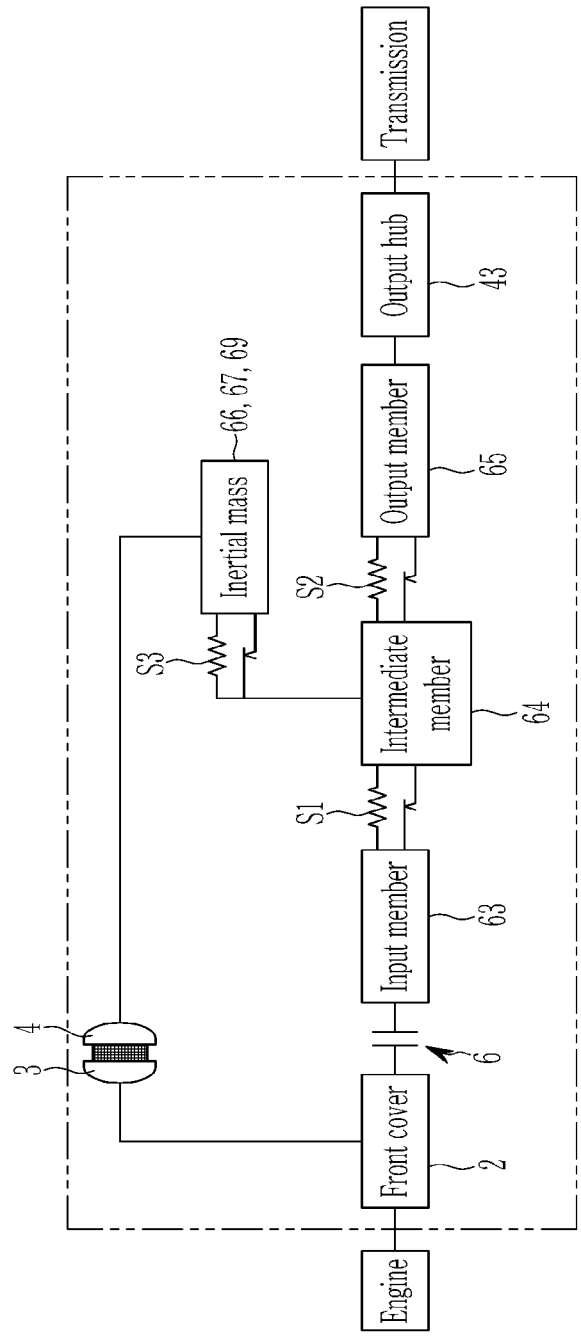
FIG. 13 is a schematic diagram for explaining a torque transmission process of a torque converter according to an embodiment of the present invention.

Hereinafter, an operation of the torque converter 1 provided with the damper assembly DA according to an embodiment of the present invention will be described in detail with reference to FIG. 13.

While the front cover 2 and the impeller 3 rotate, the torque is transmitted from the impeller 3 to the turbine through hydraulic oil flowing from the impeller 3 to the turbine 4. The torque transmitted to the turbine 4 passes through the first mass plate 66, the second mass plate 67, the intermediate plate 64, and the output plate 65, and is transmitted to the input shaft (not shown) of the transmission through the output hub 43.

When the rotation speed of the input shaft is kept approximately constant, the torque transmission through the lock-up device 6 is started. More particularly, as the hydraulic pressure changes, the piston 61 moves toward the engine, and the friction member 61a of the piston 61 is pressed toward the inner surface of the front cover 2.

As a result, the piston 61 rotates integrally with the front cover 2, and the torque is transmitted to the drive plate 62 from the from cover 2 through the piston 61.

When the torque is transmitted to the drive plate 62, the input plate 63 starts to rotate integrally with the drive plate, and the torque in which the torsion vibration is attenuated is transmitted to the intermediate plate 64 as the first damper spring S1 is primarily compressed in the rotating direction between the first spring catching portions 63a-4 and 63b-4 of the input plate 63 and the second spring catching portion 64d-1 of the intermediate plate 64.

Meanwhile, when the torque is transmitted to the intermediate plate 64, the third damper spring S3 is compressed in the rotating direction between the third spring catching portion 64e-1 of the intermediate plate 64 and the fourth spring catching portions 66b-1 and 67b-1 of the first mass plate 66 and the second mass plate 67, and the vibration of the anti-resonance damper DD having the phase opposite to the vibration input to the intermediate plate 64 is transmitted to the intermediate plate 64 through the third damper spring S3.

Then, the torque transmitted to the intermediate plate 64 passes through the second damper spring S2 and the output plate 65, and finally the vibration-damped torque is transmitted to the output hub 43.

As described above, those skilled in the art will appreciate that the present invention may be carried out in other specific ways than those set forth herein without departing from the spirit and essential characteristics of the present invention.

Therefore, the present invention is not limited to the examples described above and covers modifications of the technical spirit substantially equivalent thereto, and the scope of the invention is defined not by the detailed description of the invention but by the appended claims, and all differences within the scope will be construed as within the scope of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A torque converter includes:
a front cover connected to an output side of an engine;
an impeller connected to the front cover and integrally rotated with the front cover;
a turbine provided with a turbine blade receiving torque from the impeller through a fluid and a turbine shell supporting the turbine blade;
a lock-up device disposed between the front cover and the turbine;
a damper assembly connected to the lock-up device; and
an output hub connected to the damper assembly and transmitting the torque outside,
wherein the damper assembly comprises:
an input member to which the torque is input from the lock-up device;
an output member that is relatively rotatably while connected to the input member and is non-rotatably connected to the output hub;
a first damper spring and a second damper spring elastically connecting the input member and the output member with respect to a rotating direction;
an intermediate member that is relatively rotatably connected to the input member through the first damper spring and that is relatively rotatably connected the output member through the second damper spring; and
an anti-resonance damper installed directly on the intermediate member, the anti-resonance damper including a third damper spring accommodated in the intermediate member,
wherein the anti-resonance damper is disposed outside in a radial direction with respect to the first damper spring and the second damper spring,
wherein the intermediate member includes:
a main plate of a ring shape;
a first intermediate member spring hole in the main plate accommodating the first damper spring and the second damper spring; and
a second intermediate member spring hole in the main plate radially outside the first intermediate member spring hole and accommodating the third damper spring.

2. The torque converter of claim 1,
wherein the anti-resonance damper includes
a first mass plate disposed close to a front surface of the intermediate member and formed with a ring shape, and
a second mass plate non-rotatably connected to the first mass plate, disposed close to a rear surface of the intermediate member, and formed with a ring shape,
wherein the third damper spring elastically connects the first mass plate and the second mass plate to the intermediate member with respect to the rotating direction, and
wherein the first mass plate and the second mass plate are disposed radially outside with respect to the input member.

3. The torque converter of claim 2, wherein
a length from a central axis of the torque converter to an outermost end of the anti-resonance damper in a radial direction is 100% to 105% of a length from the central axis to an outermost end of the lock-up device in the radial direction.

4. The torque converter of claim 2, wherein
a length from a central axis of the torque converter to an outermost end of the anti-resonance damper in a radial direction is 110% to 120% of a length from the central axis to an outermost end of the turbine shell in the radial direction.

5. The torque converter of claim 2, wherein
an occupying area from a front end surface of the first mass plate to a rear end surface of the second mass plate in a central direction at least partially overlaps with an axial occupying area of the first damper spring and the second damper spring.

6. The torque converter of claim 2, wherein
an occupying area from a front-end surface of the first mass plate to a rear-end surface of the second mass plate in a central direction entirely overlaps with an axial occupying area of the first damper spring and the second damper spring.

7. The torque converter of claim 2, wherein
the anti-resonance damper further includes
an additional mass disposed between the first mass plate and the second mass plate, and connected to the first mass plate and the second mass plate such that it integrally rotates with the first mass plate and the second mass plate.

8. The torque converter of claim 2, wherein
the input member includes:
a first plate disposed close to a front surface of the intermediate member, relatively non-rotatably connected to the lock-up device, and formed with a ring shape; and
a second plate disposed close to a rear surface of the intermediate member, and connected to integrally rotate with the first plate,
wherein the first plate and the second plate are disposed inside the radial direction with respect to the anti-resonance damper.

9. The torque converter of claim 8, wherein
the first plate and the second plate include a first spring hole of an arc shape for accommodating the first damper spring and the second damper spring, respectively, and
wherein the first damper spring and the second damper spring are simultaneously accommodated in the first spring hole.

10. The torque converter of claim 9, wherein
the first intermediate member spring hole has a circumferential length corresponding to that of the first spring hole.

11. The torque converter of claim 9, wherein
the first damper spring and the second damper spring are disposed in an arc shape along the same radius inside the first spring hole.

12. The torque converter of claim 11, wherein
the first damper spring includes a first coil spring having an exterior diameter corresponding to a redial width of the first spring hole and a second coil spring disposed in the first coil spring, and
the second damper spring includes a third coil spring having an exterior diameter that is the same as an exterior diameter of the first coil spring, and a fourth coil spring disposed in the third coil spring.

13. The torque converter of claim 11, wherein
the output member includes:
a body portion of a disk shape fixed to the output hub; and
a spring connecting portion formed by extending in a radial direction from the body portion,
wherein the spring connecting portion extends between a first end portion of the first damper spring and a first end portion of the second damper spring, and
wherein the first end portion of the first damper spring and the first end portion of the second damper spring are simultaneously supported by the spring connecting portion.

14. The torque converter of claim 13, wherein
a second end portion of the first damper spring is simultaneously radially supported by one end of the first spring hole and the second spring hole, and
a second end portion of the second damper spring is simultaneously radially supported by the other end of the first spring hole and the second spring hole.

15. A torque converter includes:
a front cover connected to an output side of an engine;
an impeller connected to the front cover and integrally rotated with the front cover;
a turbine provided with a turbine blade receiving torque from the impeller through a fluid and a turbine shell supporting the turbine blade;
a lock-up device disposed between the front cover and the turbine;
a damper assembly connected to the lock-up device; and
an output hub connected to the damper assembly and transmitting the torque outside,
wherein the damper assembly comprises:
an input member to which the torque is input from the lock-up device;
an output member that is relatively rotatably while connected to the input member and is non-rotatably connected to the output hub;
a first damper spring and a second damper spring elastically connecting the input member and the output member with respect to a rotating direction;
an intermediate member that is relatively rotatably connected to the input member through the first damper spring and that is relatively rotatably connected the output member through the second damper spring; and
an anti-resonance damper installed directly on the intermediate member, the anti-resonance damper including a third damper spring accommodated in the intermediate member,
wherein the anti-resonance damper is disposed outside in a radial direction with respect to the first damper spring and the second damper spring, and
wherein the anti-resonance damper further includes
a first mass plate disposed close to a front surface of the intermediate member and formed with a ring shape, and
a second mass plate non-rotatably connected to the first mass plate, disposed close to a rear surface of the intermediate member, and formed with a ring shape,
a connecting bracket non-rotatably connecting at least either of the first mass plate and the second mass plate to the turbine shell.

* * * * *